United States Patent
Mizutani

(10) Patent No.: US 10,142,934 B2
(45) Date of Patent: Nov. 27, 2018

(54) WIRELESS COMMUNICATION APPARATUS AND COMMUNICATION SYSTEM

(71) Applicant: DENSO CORPORATION, Kariya, Aichi-pref. (JP)

(72) Inventor: Taizo Mizutani, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 78 days.

(21) Appl. No.: 14/768,902

(22) PCT Filed: Jan. 27, 2014

(86) PCT No.: PCT/JP2014/000384
§ 371 (c)(1),
(2) Date: Aug. 19, 2015

(87) PCT Pub. No.: WO2014/129113
PCT Pub. Date: Aug. 28, 2014

(65) Prior Publication Data
US 2016/0007291 A1    Jan. 7, 2016

(30) Foreign Application Priority Data

Feb. 20, 2013    (JP) .................................. 2013-031265

(51) Int. Cl.
*H04W 52/02*    (2009.01)

(52) U.S. Cl.
CPC ... *H04W 52/0229* (2013.01); *H04W 52/0241* (2013.01); *Y02D 70/00* (2018.01); *Y02D 70/1262* (2018.01); *Y02D 70/164* (2018.01)

(58) Field of Classification Search
None
See application file for complete search history.

(56) References Cited

U.S. PATENT DOCUMENTS

| | | | |
|---|---|---|---|
| 5,797,094 A | 8/1998 | Houde et al. | |
| 2006/0033744 A1* | 2/2006 | Perez | H04M 1/73 345/502 |

(Continued)

FOREIGN PATENT DOCUMENTS

| | | |
|---|---|---|
| EP | 1959615 A1 | 8/2008 |
| EP | 2161887 A1 | 3/2010 |

(Continued)

OTHER PUBLICATIONS

International Search Report and Written Opinion (in Japanese with English Translation) for PCT/JP2014/000384, dated Mar. 18, 2014; ISA/JP.

*Primary Examiner* — Christopher Crutchfield
*Assistant Examiner* — Alan Lindenbaum
(74) *Attorney, Agent, or Firm* — Harness, Dickey & Pierce, P.L.C.

(57) ABSTRACT

A wireless terminal apparatus in a communication system shares a reference cycle with a data center. The reference cycle includes an incoming-call acceptance ready time that ranges from an incoming-call acceptance start time point to an incoming-call acceptance end time point. The incoming-call acceptance start time point corresponds to an outgoing-call generation time point of generating an outgoing-call by the data center. The outgoing-call generation end time point is set in consideration of a delay in the outgoing-call. The wireless terminal apparatus is set in an intermittent standby state that is contained in the incoming-call acceptance ready time. In the remaining time excluding the incoming-call acceptance ready time within the reference cycle, the wireless terminal apparatus is set in a sleep state in which no incoming-call is accepted.

17 Claims, 9 Drawing Sheets

(56) References Cited

U.S. PATENT DOCUMENTS

| | | | |
|---|---|---|---|
| 2008/0192703 A1* | 8/2008 | Suzuki | H04W 76/048 370/335 |
| 2009/0175186 A1* | 7/2009 | Du | H04W 76/048 370/252 |
| 2010/0323683 A1* | 12/2010 | Kazmi | H04W 64/00 455/422.1 |
| 2011/0268003 A1* | 11/2011 | Li | H04W 52/0216 370/311 |
| 2012/0052853 A1* | 3/2012 | Mohammed | H04W 68/00 455/418 |
| 2013/0016638 A1* | 1/2013 | Lee | H04W 52/0251 370/311 |

FOREIGN PATENT DOCUMENTS

| | | |
|---|---|---|
| JP | H01147930 A | 6/1989 |
| JP | H11511923 A | 10/1999 |
| JP | 2000068920 A | 3/2000 |
| JP | 2001352570 A | 12/2001 |
| JP | 2002368676 A | 12/2002 |
| JP | 4098942 B2 | 6/2008 |
| JP | 4225706 B2 | 2/2009 |
| JP | 2010087869 A | 4/2010 |
| JP | 2010518765 A | 5/2010 |
| JP | 2012507891 A | 3/2012 |

* cited by examiner

WIRELESS COMMUNICATION APPARATUS AND COMMUNICATION SYSTEM

CROSS REFERENCE TO RELATED APPLICATIONS

This application is a U.S. National Phase Application under 35 U.S.C. 371 of International Application No. PCT/JP2014/000384 filed on Jan. 27, 2014 and published in Japanese as WO 2014/129113 A1 on Aug. 28, 2014. This present application is based on and claims the benefit of priority from Japanese Patent Application No. 2013-031265 filed on Feb. 20, 2013. The entire disclosures of all of the above applications are incorporated herein by reference.

TECHNICAL FIELD

The present disclosure relates to a wireless communication apparatus and a communication system having a function of waiting for an incoming-call in an intermittent standby state of intermittently accepting an incoming-call.

BACKGROUND ART

There is a known wireless communication apparatus having a function of waiting for an incoming-call in an intermittent standby state, which intermittently accepts an incoming-call in a standby mode, in order to save power consumption. The intermittent standby state alternately repeats (i) an incoming-call acceptable state and (ii) a state of saving power by failing to accept any incoming-call for only predetermined time.

PRIOR ART LITERATURES

Patent Literature

Patent Literature 1: JP 2002-368676 A

SUMMARY OF INVENTION

For example, a communication mode spread recently, such as LTE (Long Term Evolution), is caused to decrease time for saving power in an intermittent standby state to increase a standby power usage amount in a wireless communication apparatus. An object of the present disclosure is to reduce such a standby power usage amount in a wireless communication apparatus.

To achieve the above object, according to a first example of the present disclosure, a wireless communication apparatus is provided to have a function of waiting for an incoming-call in an intermittent standby state that intermittently accepts an incoming-call. The wireless communication apparatus shares a reference cycle with a communication target apparatus being a communication partner. The wireless communication apparatus includes an intermittent standby setting section and a sleep state setting section. The intermittent standby setting section sets the wireless communication apparatus into the intermittent standby state that is caused to be contained in an incoming-call acceptance ready time within the reference cycle shared with the communication target apparatus. The incoming-call acceptance ready time ranges (i) from an incoming-call acceptance start time point corresponding to an outgoing-call generation time point at which the communication target apparatus generates an outgoing-call, (ii) to an incoming-call acceptance end time point which is set in consideration of delay in the outgoing-call. The sleep state setting section sets the wireless communication apparatus into a sleep state that accepts no incoming-call in a time within the reference cycle excluding the incoming-call acceptance ready time.

That is, the above wireless communication apparatus, which shares a reference cycle with a communication target apparatus, is set into an intermittent standby state that is contained in an incoming-call acceptance ready time during which an incoming-call may be accepted in relation to an outgoing-call generation time point within the reference cycle. In contrast, the apparatus shifts from the intermittent standby state to a sleep state that is contained in a time during which no incoming-call is accepted in relation to the outgoing-call generation time point.

Therefore, such a wireless communication apparatus shifts to the sleep state in the time during which no incoming-call is accepted in relation to the outgoing-call generation time point, reducing power consumption in the standby mode without missing an incoming-call from a communication target apparatus.

The incoming-call acceptance start time may be set at the outgoing-call generation time point or time after the outgoing-call generation time point by predetermined time considering a delay from the outgoing-call generation time point. The wireless communication apparatus may be used to be mounted in a vehicle.

A wireless communication apparatus mounted in a vehicle may cause runout of the vehicle battery due to the power consumption increasing, e.g., in a parking state stopping the engine and failing to charge the vehicle battery from an alternator. Employing the above wireless communication apparatus as an in-vehicle wireless communication apparatus is preferable to help prevent the battery runout.

To achieve the object, a program product for realizing a computer as an element in a wireless communication apparatus or a communication target apparatus may be also provided.

Descriptions of the claims can be combined where possible. A part of components may be excluded as long as the object of the disclosure can be achieved.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, embodiments of the present disclosure will be described with reference to the diagrams.

First Embodiment

[Configuration of the Embodiment]

A communication system 1 of the embodiment, which permits a wireless terminal apparatus 10 mounted in a vehicle and a data center 60 to transmit and receive data from each other, intends to save power more, particularly in a standby state taking place until the wireless terminal apparatus 10 receives data from the data center 60.

Figure 1:
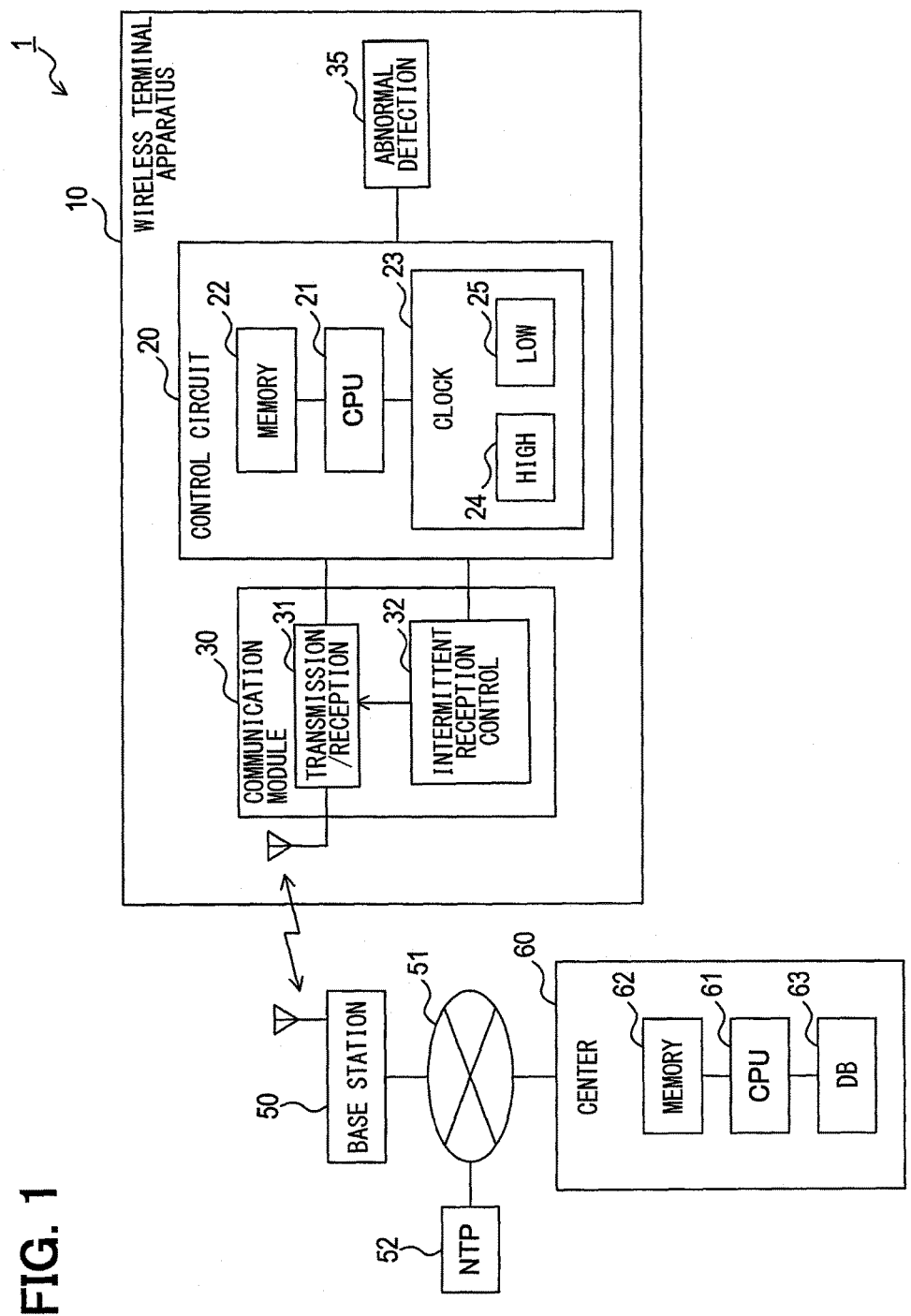
FIG. 1 is a block diagram illustrating a schematic configuration of a communication system according to a first embodiment of the present disclosure.

FIG. 1 illustrates the communication system 1 including a wireless terminal apparatus 10 mounted in a vehicle, a base station 50, an NTP (Network Time Protocol) server 52, and a data center 60. Note that the system 1 is provided to include multiple base stations 50 (unshown) and multiple wireless terminal apparatuses 10 (unshown), and the data center 60 transmits/receives data to/from the respective wireless terminal apparatuses 10.

The base station 50 is, for example, a wireless base station for cell phones, performs wireless communication with one or a plurality of wireless terminal apparatuses 10 located in a communication range, and also performs communication with various apparatuses (such as the NTP server 52 and the data center 60) connected via an Internet 51.

The NTP server 52 is a server for making clocks of the apparatuses synchronized with correct time. The wireless terminal apparatus 10 and the data center 60 obtain the correct time by accessing the server 52. The wireless terminal apparatus 10 and the data center 60 may synchronize time of their clocks with correct time by time information received by a receiver such as a GPS (Global Positioning System).

In the application, "information" is used not only as an uncountable noun but also a countable noun. A plurality of informations are, for example, recognized as being equivalent to a plurality of pieces of information or a plurality of information items.

The wireless terminal apparatus 10 includes a control circuit 20, a communication module 30, and an abnormality detecting unit 35. The control circuit 20 can be also mentioned as a control and arithmetic unit. The control circuit 20 is a computer having a CPU 21 and a memory 22 such as ROM and RAM. The control circuit 20 has a clock generating unit 23 having two kinds of clocks; a high-speed clock 24 and a low-speed clock 25.

The CPU 21 executes various processes such as standby process to be described later on the basis of a program stored in the memory 22. The process is performed according to low-speed or high-speed clocks generated by the clock generating unit 23.

The wireless terminal apparatus 10 operates in conformity to LTE (Long Term Evolution) as one of communication standards for cell phones and performs intermittent standby at the time of accepting an incoming-call from the outside. The intermittent standby refers to a standby operation of repeating a state of accepting a signal related to an incoming-call from the base station 50 (incoming-call acceptable state) and a state of unaccepting the signal (incoming-call unacceptable state) in relatively short cycles (for example, 1.28 second).

The base station 50 is set to establish a connection by making the wireless terminal apparatus 10 accept an incoming-call in a state where the wireless terminal apparatus 10 can accept a signal related to an incoming-call from the base station 50.

The high-speed clock 24 in the clock generating unit 23 generates a clock in the incoming-call acceptable state or in performing communication with the base station 50. The low-speed clock 25 always generates clocks. This configuration permits the incoming-call unacceptable state to operate only the low-speed clock 25 while stopping the high-speed clock 24 exhibiting generally high power consumption, thereby saving power.

Figure 4A:
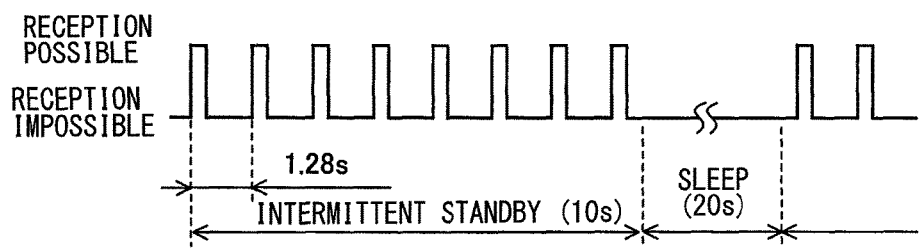
FIG. 4A is a time chart illustrating an intermittent standby state and a sleep state.

The wireless terminal apparatus 10 is set to cyclically repeat an intermittent standby state and a sleep state. The intermittent standby state switches between the incoming-call acceptable state and the incoming-call unacceptable state in relatively short time; the sleep state continues the incoming-call unacceptable state for relatively long time (refer to FIGS. 4A and 4B, the details will be described later). The cycle is shared as a reference cycle with the data center 60. For example, the reference cycle is obtained from the data center 60 together with incoming-call acceptance start time and incoming-call acceptance end time which will be described later at the first time of communication with the data center 60.

The communication module 30 is also referred to as a communication control circuit. The communication module 30 includes the function of a known communication module of generating or accepting an incoming-call in response to an instruction from the control circuit 20 or a signal from the base station 50. The communication module 30 has a transmitting/receiving unit 31 and an intermittent reception control unit 32.

The transmitting/receiving unit 31 includes the function of converting data, of which transmission is instructed by the control circuit 20, into a packet of a predetermined form and the function of recovering a packet received from the base station 50 to data. The transmitting/receiving unit 31 switches between the incoming-call acceptable state and the incoming-call unacceptable state in response to an instruction from the intermittent reception control unit 32.

The abnormality detecting unit 35, which is a general apparatus detecting abnormality occurring in a vehicle, such as theft or failure of the vehicle, sends a signal to the control circuit 20 when detecting abnormality. When abnormality occurs, the control circuit 20 generates an outgoing-call indicating occurrence of the abnormality to the data center 60. Generating an outgoing-call from the wireless terminal apparatus 10, which can employ a known technology, is not described in the specification.

The data center 60 is a computer including a CPU 61 and a memory 62 such as a ROM and a RAM. The data center 60 also includes a shared information database 63. The shared information database 63 records incoming-call acceptance start time at which each of the wireless terminal apparatuses 10 enters the intermittent standby state in the reference cycle, and incoming-call acceptance end time at which each of the wireless terminal apparatuses 10 enters the sleep state.

Figure 2:
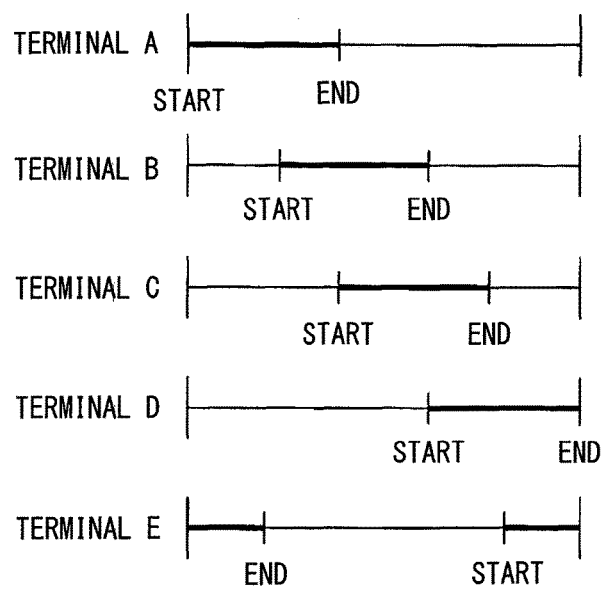
FIG. 2 is an explanatory diagram illustrating an outgoing-call generation time point of a data center.

As in FIG. 2, the incoming-call acceptance start times and the incoming-call acceptance end times of the wireless terminal apparatuses 10 are set to be different among the wireless terminal apparatuses 10. That is, the outgoing-call generation time points by the data center 60 are set to be dispersed in the respective wireless terminal apparatuses 10, thereby suppressing concentration of processes for outgoing-call generation of the data center 60.

The outgoing-call generation time point to each of the wireless terminal apparatuses 10 by the data center 60 is set to match the incoming-call acceptance start time. Since a signal by outgoing-call generation may reach the wireless terminal apparatus 10 during a period from the incoming-call acceptance start time to the incoming-call acceptance end time (refer to FIG. 4B), the outgoing-call generation time point may be set to a time point before or after the incoming-call acceptance start time in considering the delay time of the signal by the outgoing-call.

[Processes of the Embodiment]

Processes executed in the communication system 1 will be described below.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, the standby process by the wireless terminal apparatus 10 starts when the control circuit 20 (i.e., the CPU 21) turns of the power of the wireless terminal apparatus 10, and is repeatedly executed when an outgoing-call is not generated by the apparatus itself.

Figure 3:
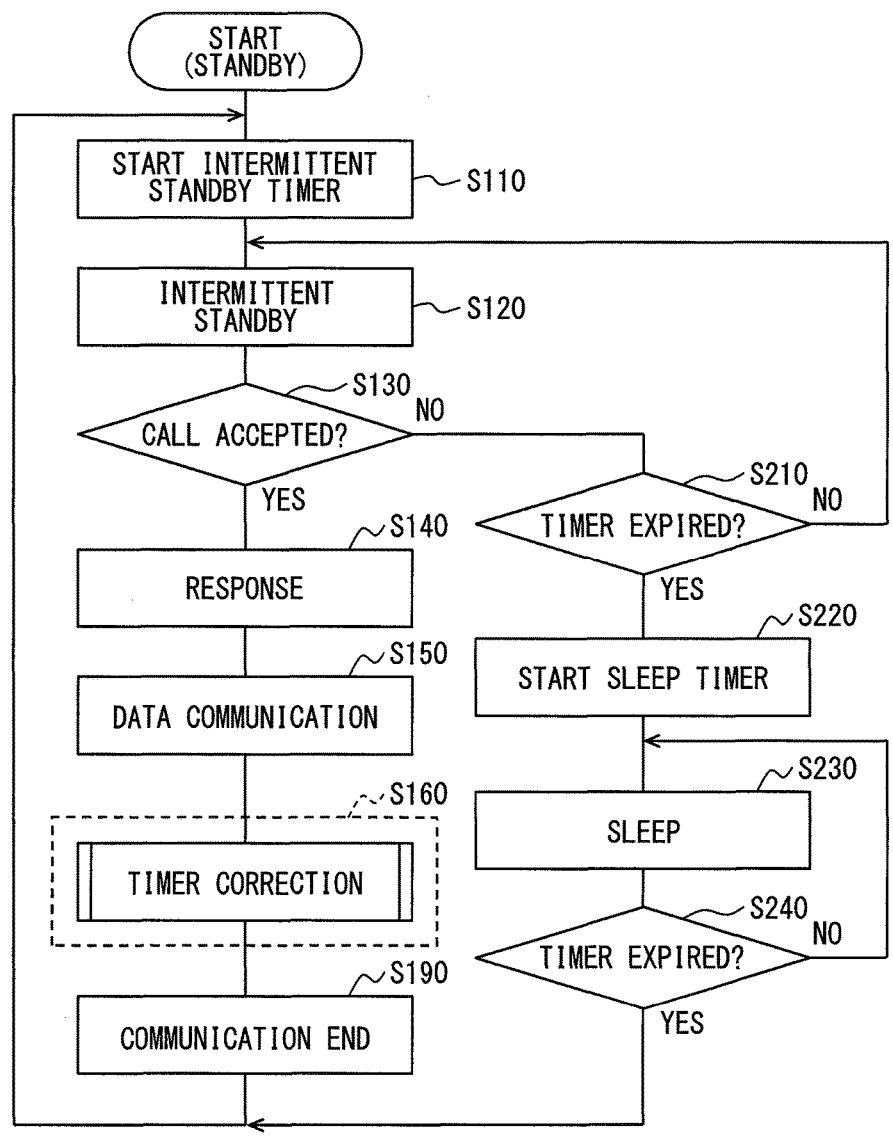
FIG. 3 is a flowchart illustrating standby process executed by a control circuit.

Specifically, as in the flowchart of FIG. 3 executed by the control circuit 20, the standby process starts, first, a timer of the intermittent standby mode expressing continuation time of the intermittent standby state (S110), and sets the intermittent standby state (S120). The intermittent standby state, as in FIG. 4A, switches between the incoming-call acceptable mode and the incoming-call unacceptable mode in relatively short time (for example, 1.28-second cycle).

Subsequently, whether there is an incoming-call or not is determined (S130). When there is an incoming-call (S130: YES), a known process of responding to the incoming-call is performed (S140), and data communication is executed (S150). When data transmission/reception is finished, a known process of finishing the process is performed (S190), and the processing returns to S110.

When there is no incoming-call at S130 (S130: NO), whether the timer of the intermittent standby mode expires or not is determined (S210). The timer of the intermittent standby mode is set to, for example, a value of about ten seconds.

When the timer does not expire (S210: NO), the processing returns to S120. When the timer expires (S210: YES), a timer of a sleep mode expressing continuation time of the sleep state is started (S220), and the wireless terminal apparatus 10 is set to the sleep state (S230). The sleep state stops not only the communication module 30 but also the functions other than the function of managing the timer (low-speed clock) and the function of detecting abnormality in the vehicle, thereby saving power. Note that the sleep state accepting no incoming-call does not signify that the wireless terminal apparatus 20 fails to accept any incoming-call. This is because the data center 60 generates none of outgoing-calls inherently during the sleep state (refer to FIG. 4A).

Subsequently, whether the timer of the sleep mode expired or not is determined (S240). When the timer does not expire (S240: NO), the processing returns to S230. When the timer expired (S240: YES), the processing returns to S110.

Figure 5:
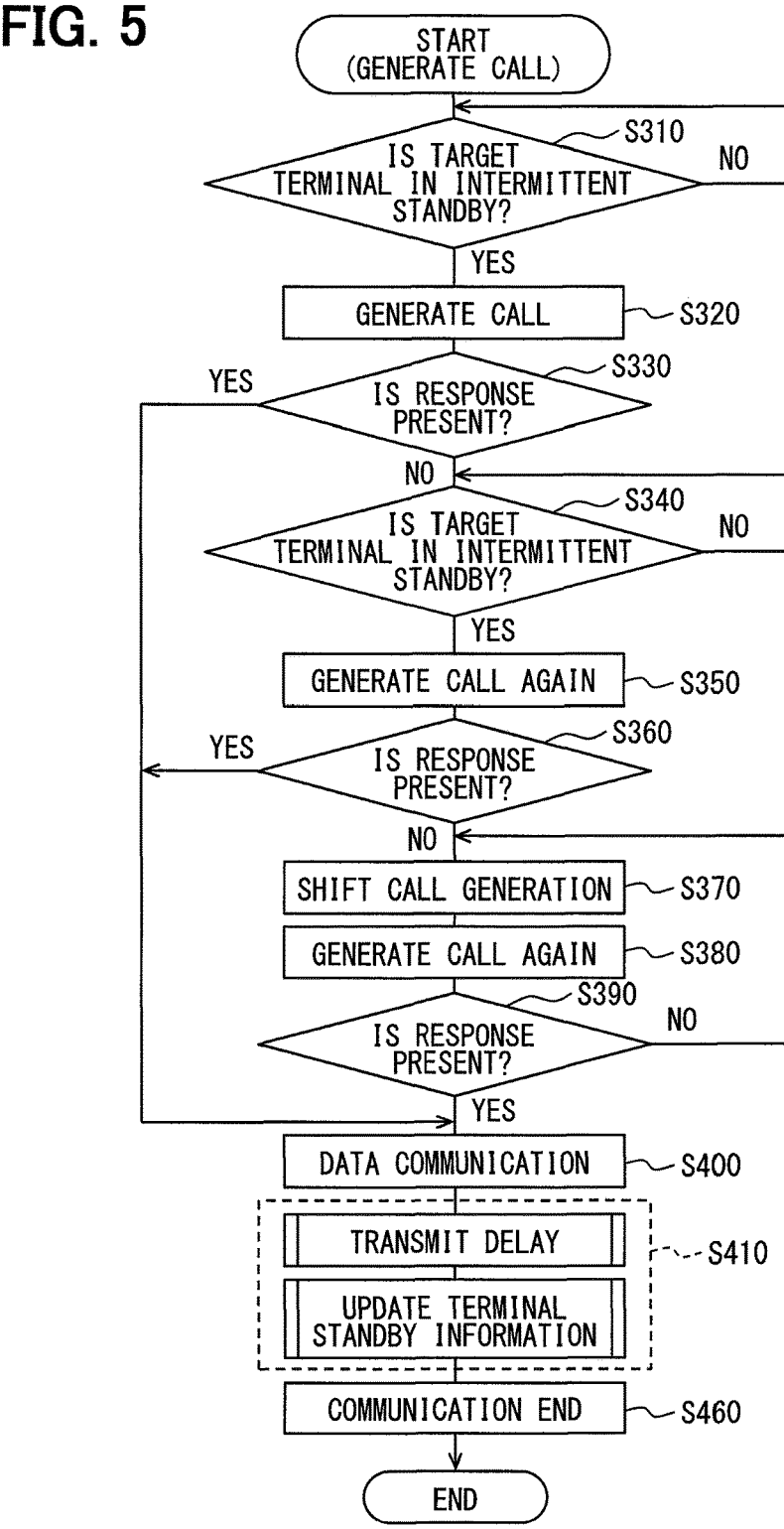
FIG. 5 is a flowchart illustrating outgoing-call generating process executed by the data center.

In correspondence to such incoming-call accepting process, the data center 60 (i.e., CPU 61) performs an outgoing-call generating process in FIG. 5. In response to a request etc., from a user or a maker of a vehicle, the outgoing-call generating process is executed to transmit information or an instruction from the data center 60 to the vehicle.

The outgoing-call generating process, as in FIG. 5, determines whether the wireless terminal apparatus 10 serving as an object is in the intermittent standby state or not (S310). The data center 60, which has a reference cycle synchronized with the wireless terminal apparatuses 10, can recognize whether the respective wireless terminal apparatuses 10 are in the intermittent standby state or the sleep state.

When the wireless terminal apparatus 10 as an object is not in the intermittent standby state (S310: NO), S310 is repeated. When the wireless terminal apparatus 10 as an object is in the intermittent standby state (S310: YES), an outgoing-call to the wireless terminal apparatus 10 as an object is generated (S320).

Subsequently, the presence/absence of a response from the wireless terminal apparatus 10 is determined (S330). When there is a response (S330: YES), the processing shifts to S400 to be described later. When there is no response (S330: NO), whether the wireless terminal apparatus 10 as an object is in an intermittent standby state (an intermittent standby state subsequent to the sleep state after the intermittent standby state in which the outgoing-call generation is performed in S320) is determined (S340).

When the apparatus 10 is not in the intermittent standby state (S340: NO), S340 is repeated. When the apparatus 10 is in the intermittent standby state (S340: YES), outgoing-call generation to the wireless terminal apparatus 10 as an object is performed again (S350).

Subsequently, the presence/absence of a response from the wireless terminal apparatus 10 is determined (S360). When there is a response (S360: YES), the processing shifts to S400 to be described later. When there is no response (S360: NO), the outgoing-call generation time point is shifted (S370).

The shift of the outgoing-call generation time point indicates a change of the time point when outgoing-call generation is performed in the reference cycle. For example, when outgoing-call generation is set at the time point of 0 second after start of the reference cycle when the reference cycle is 30 seconds, the time point of outgoing-call generation is delayed by about 10 seconds, and outgoing-call generation is performed at the time point of 10 seconds after start of the reference cycle.

At the time point after the shift is performed, outgoing-call generation to the wireless terminal apparatus 10 as an object is performed again (S380).

The presence/absence of a response from the wireless terminal apparatus 10 is determined (S390). When there is no response (S390: NO), the processing returns to S370. When there is a response (S390: YES), communication of data is executed (S400). When transmission/reception of data is finished, a known process of finishing the communication is performed (S460), and the outgoing-call generating process is finished.

[Effect of the Embodiment]

In the communication system 1, the control circuit 20 in the wireless terminal apparatus 10 sets the wireless terminal apparatus 10 into the intermittent standby state that is provided to be contained in an incoming-call acceptance ready time within the reference cycle shared with the data center 60 as a communication partner. The incoming-call acceptance ready time, which substantially enables incoming-call acceptance, ranges from the incoming-call acceptance start time point to the incoming-call acceptance end time point. The incoming-call acceptance start time corresponds to an outgoing-call generation time point at which the data center 60 generates an outgoing-call to the wireless terminal apparatus 10. The incoming-call acceptance end time point is set in consideration of delay of incoming-call acceptance in the wireless terminal apparatus 10. The time excluding the incoming-call acceptance ready time (which is equal to the time in the intermittent standby state) within the reference cycle is used to set the sleep state of the wireless terminal apparatus 10 failing to accept any incoming-call. The incoming-call acceptance ready time is also referred to as incoming-call acceptance intermittent standby time.

In transmitting some information (such as a digital signal including a packet and other data) to the wireless terminal apparatus 10, the data center 60 generates an outgoing-call to the wireless terminal apparatus 10 at an outgoing-call generation time point that is predetermined within the reference cycle shared with the wireless terminal apparatus 10.

Specifically, the wireless terminal apparatus 10, which shares the reference cycle with the data center 60, sets the intermittent standby state into the incoming-call acceptance ready time within the reference cycle. The incoming-call acceptance ready time is the time during which an incoming-call can be substantially received in relation to the outgoing-call generation time point. In contrast, the time, during which no incoming-call is accepted (also referred to as incoming-call acceptance unready time) in relation to the outgoing-call generation time point, is used to set the sleep state to which the wireless terminal apparatus 10 shifts from the intermittent standby state.

Figure 4B:
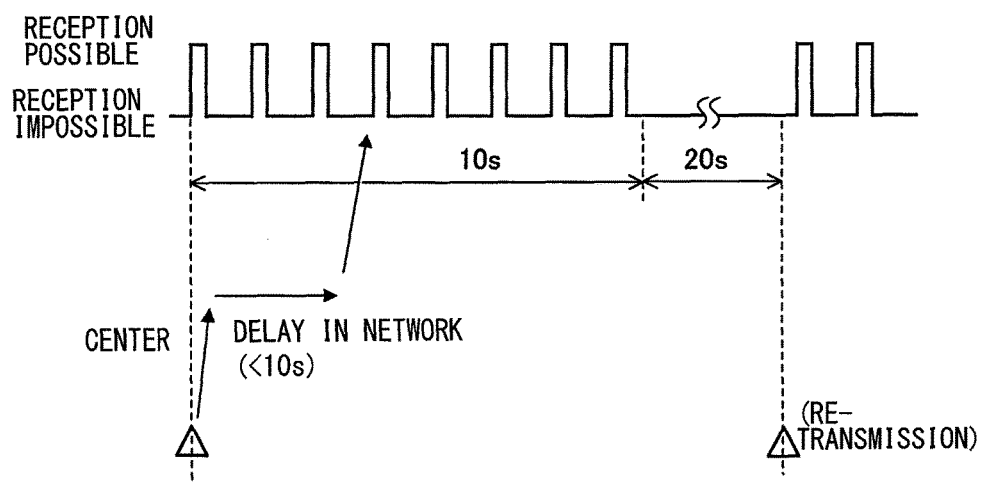
FIG. 4B is a time chart illustrating an intermittent standby state and a sleep state.

The wireless terminal apparatus 10, shifting to the sleep state in the time during which no incoming-call is accepted in relation to the outgoing-call generation time point, stops the high-speed clock 24 exhibiting generally high consumption power, saving power. The delay occurring in outgoing-call generation by the data center 60, as in FIG. 4B, is considered in setting the time point of shifting to the sleep state.

This can suppress the power consumption in the standby without missing an incoming-call from the data center 60.

The wireless terminal apparatus 10 is used by being mounted in a vehicle. When power consumption increases, e.g., in a parking state where the engine stops and the vehicle battery is not charged from an alternator, the wireless terminal apparatus 10 mounted in the vehicle may cause runout of the battery. Employing the wireless terminal apparatus 10 as an in-vehicle wireless terminal apparatus is preferable in suppressing the battery runout.

When an incoming-call from the data center 60 is accepted in the intermittent standby state, the wireless terminal apparatus 10 in the communication system 1 is inhibited from shifting to the sleep state.

The communication system 1, which is accepting an incoming-call and executing a process accompanying the incoming-call acceptance, can be prevented from shifting to the sleep state.

Further, when an incoming-call from the data center 60 is accepted in the intermittent standby state, the wireless terminal apparatus 10 in the communication system 1 is inhibited from shifting to the sleep state until the process accompanying the incoming-call acceptance is finished.

The communication system 1, which has been inhibited from shifting to the sleep state until the process accompanying the incoming-call acceptance is finished, is permitted to shift to the sleep state when the process accompanying the incoming-call acceptance is finished. This suppresses the power consumption in the standby while reliably executing the process accompanying the incoming-call acceptance.

The data center 60 in the communication system 1, which determines the presence/absence of a response from the wireless terminal apparatus 10 to outgoing-call generation from itself, performs outgoing-call generation again at the next outgoing-call generation time point when there is no response from the wireless terminal apparatus 10.

The communication system 1 performs outgoing-call re-generation at the next outgoing-call generation time point when the data center 60 receives no response from the wireless terminal apparatus 10. Such outgoing-call re-generation enables to expect a response, improving reliability of communication.

Further, the data center 60 in the communication system 1, which determines the presence/absence of a response from the wireless terminal apparatus 10 to outgoing-call generation from itself, performs outgoing-call generation again at another time point when there is no response from the wireless terminal apparatus 10 to the outgoing-call generation. The other time point is obtained by adding or subtracting preset predetermined time to or from the next outgoing-call generation time point.

In the communication system 1, the reference cycle and the outgoing-call generation time point/incoming-call acceptance time point may be not synchronized (the start points of the reference cycles are deviated). Even in such case, the outgoing-call generation time point is shifted only by predetermined time, performing outgoing-call generation again to enable to expect a response. This improves reliability of communication.

A plurality of wireless terminal apparatuses 10 are provided in the communication system 1. The initial outgoing-call generation section of the data center 60 sets the outgoing-call generation time points to the respective wireless terminal apparatuses 10 to be dispersed.

The communication system 1, which disperses the outgoing-call generation time points to the respective wireless terminal apparatuses 10, can suppress concentration of process loads on the data center 60 to a specific time.

Second Embodiment

Next, a communication system of another embodiment will be described. In the embodiment (second embodiment), only parts different from those in the communication system 1 of the first embodiment will be described specifically, whereas the same reference numerals are designated to parts similar to those in the communication system 1 of the first embodiment, and the description of the similar parts will not be repeated.

Figure 6A:
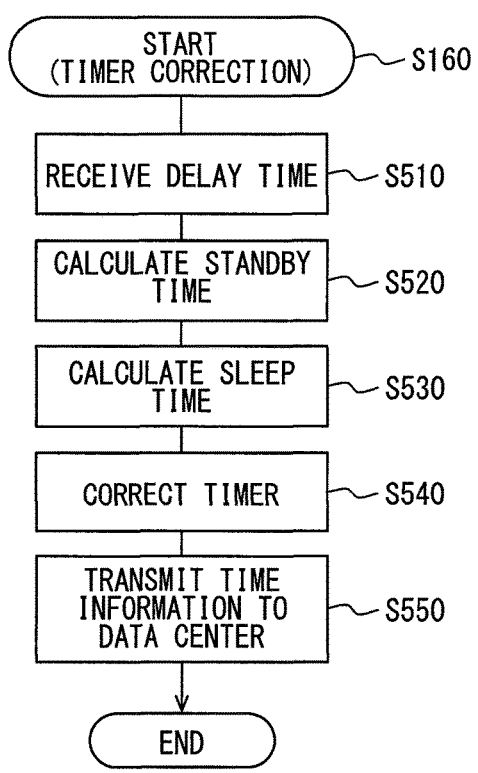
FIG. 6A is a flowchart illustrating timer value correcting process in the standby process, according to a second embodiment of the present disclosure.

The wireless terminal apparatus 10 of the second embodiment executes a timer value correcting process between S150 and S190 in the standby process in FIG. 3 (S160). As in FIG. 6A, first, delay information (information of delay time) is received from the data center 60 (S510).

The delay information is used to calculate time necessary for the intermittent standby state (S520). For example, when the intermittent reception cycle of the terminal is 1.28 seconds, time from outgoing-call generation of the data center to response of the terminal is 0.5 second, time synchronization deviation between the center and the terminal is one second, delay time at the time of network congestion is two seconds, and margin is one second, the time is obtained as 1.28+0.5+1+2+0.7=5.78 seconds.

Subsequently, sleep possible time is calculated (S530). In the process, since the reference cycle as the sum of time in the intermittent standby state and the time in the sleep state is determined, the sleep possible time is obtained by subtracting the time in the intermittent standby state from the reference cycle.

The timer in the intermittent standby state and the timer in the sleep state are corrected according to times in the states obtained in S520 and S530 (S540), and time of each of the states is transmitted to the data center 60 (S550). When the process is finished, the timer value correcting process is finished.

In correspondence with the timer value correcting process, the data center 60 of the second embodiment executes a delay information transmitting process and a terminal apparatus standby information updating process between S400 and S460 in the outgoing-call generating process of FIG. 5 (S410).

Figure 6B:
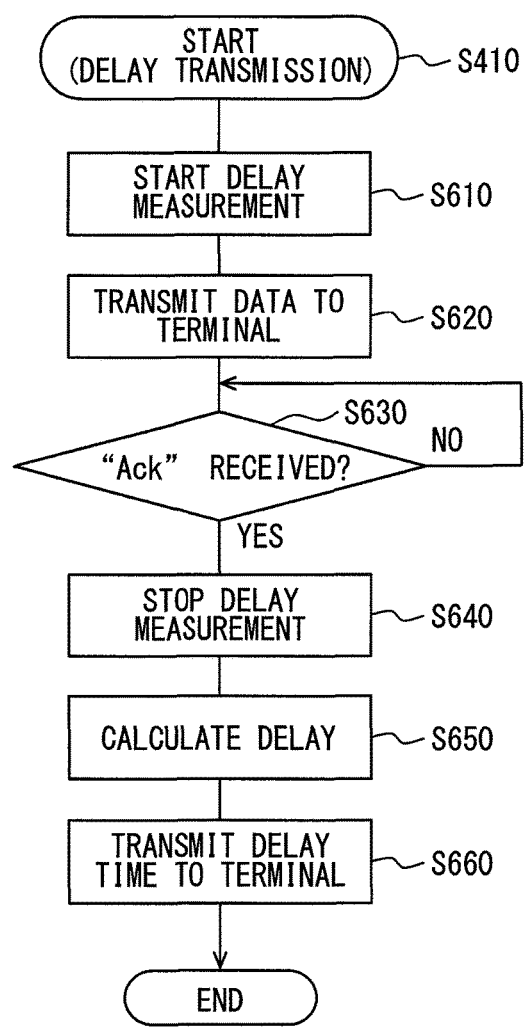
FIG. 6B is a flowchart illustrating delay information transmitting process in the outgoing-call generating process, according to the second embodiment of the present disclosure.

In the delay information transmitting process, as in FIG. 6B, first, a timer measuring delay time is started (S610). Then, data is transmitted to the wireless terminal apparatus 10 (S620) and whether "Ack" corresponding to response to the data is received from the wireless terminal apparatus 10 or not is determined (S630).

When "Ack" is not received (S630: NO), the processing returns to S630. When "Ack" is received (S630: YES), the timer measuring delay time is stopped (S640) and time when the timer is stopped is calculated as delay time (S650). The delay time is transmitted as delay information to the wireless terminal apparatus 10 (S660) and the delay information transmitting process is finished.

Figure 7A:
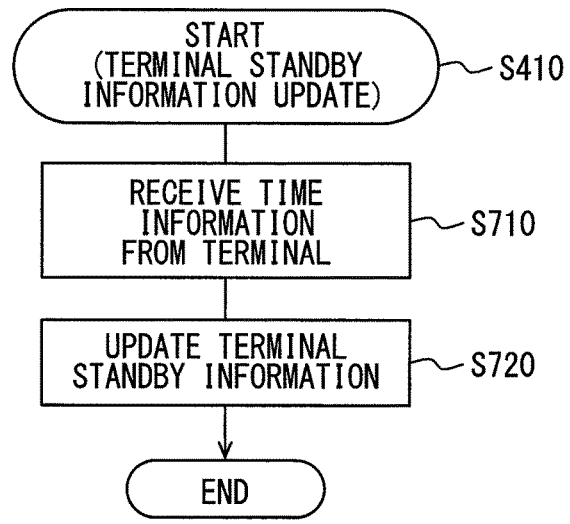
FIG. 7A is a flowchart illustrating terminal apparatus standby information updating process in the outgoing-call generating process, according to the second embodiment of the present disclosure.

In the terminal apparatus standby information updating process, as in FIG. 7A, the time in the intermittent standby state and the time in the sleep state are received from the wireless terminal apparatus 10 (S710), and the standby time points (the start time and the end time of the intermittent standby state to the reference cycle) of the wireless terminal apparatus 10 are updated in the shared information database 63 (S720). When the process is finished, the terminal apparatus standby information updating process is finished.

In the communication system of the second embodiment, the wireless terminal apparatus 10 obtains delay information related to network delay time in communication with the data center 60 and, on the basis of the delay information, sets at least one of the incoming-call acceptance start time point and the incoming-call acceptance end time.

In the communication system, delay time since outgoing-call generation to incoming-call acceptance can be estimated on the basis of the delay information. Consequently, even when the incoming-call acceptance ready time is made further shorter, missing of the incoming-call acceptance is suppressed. Therefore, the incoming-call acceptance ready time can be further shortened, so that power consumption in the standby can be further suppressed.

Other Embodiments

The embodiments of the present disclosure are not limited to the foregoing embodiments but employ various forms as long as they belongs to the technical range of the disclosure.

For example, although the wireless terminal apparatus 10 calculates delay time in the second embodiment, delay time may be calculated in the data center 60. In this case, it is sufficient for the wireless terminal apparatus 10 to execute a timer value correcting process as in FIG. 7B.

Figure 7B:
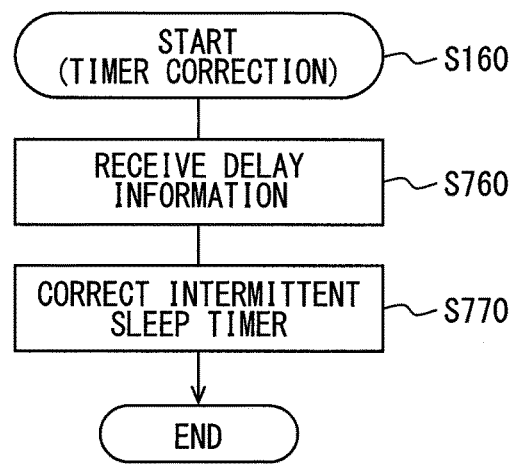
FIG. 7B is a flowchart illustrating timer value correcting process, according to another embodiment of the present disclosure.

That is, in a timer value correcting process of a modification, as in FIG. 7B, delay information (time in the intermittent standby state and time in the sleep state) generated in the data center 60 is received (S760) and, on the basis of the information, the time in the intermittent standby state and time in the sleep state are set (S770).

Figure 8:
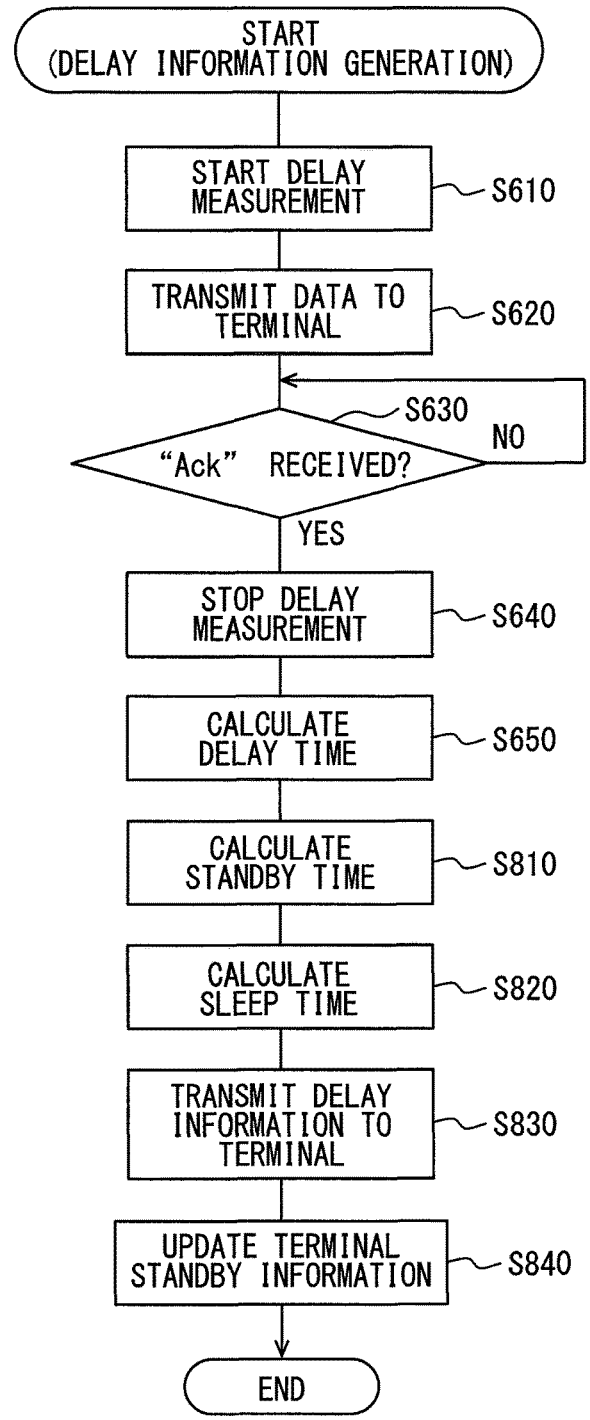
FIG. 8 is a flowchart illustrating delay information generating process in the outgoing-call generating process, according to another embodiment of the present disclosure.

In the data center 60, as a process corresponding to the timer value correcting process of the modification, it is sufficient to execute a delay information generating process illustrated in FIG. 8. The delay information generating process may be executed in place of the delay information transmitting process and the terminal apparatus standby information updating process in the second embodiment.

In the delay information generating process, as in FIG. 8, first, processes similar to the processes of S610 to S650 are executed. Subsequently, on the basis of delay information, time necessary for the intermittent standby state is calculated (S810). The process can be performed in a manner similar to S520.

Then, sleep possible time is calculated (S820). In the process, like S530, the sleep possible time is obtained by subtracting the time in the intermittent standby state from the reference cycle.

The time in the intermittent standby state and the time in the sleep state are set as delay information and the delay information is transmitted to the wireless terminal apparatus 10 (S830). The standby time points (start time and end time of the intermittent standby state to the reference cycle) of the wireless terminal apparatus 10 are updated in the shared information database 63 (S840). When the process is finished, the delay information generating process is finished.

Although the disclosure is applied to the wireless terminal apparatus 10 mounted in a vehicle in the foregoing embodiments, the wireless terminal apparatus 10 is not limited to a vehicle but may be applied as, for example, a monitoring apparatus monitoring a plant or a portable terminal apparatus carried by a user.

A part of the configuration and the process in the embodiments can be arbitrarily excluded or combined within the range in which the present disclosure is satisfied. For example, the processes in S340 to S360 may be excluded or repeatedly applied.

[Configuration of Embodiments]

The wireless terminal apparatus 10 of the embodiments is also referred to as a wireless communication apparatus. The data center 60 of the embodiments is also referred to as a communication target apparatus. The processes of S110 to S130 and S210 in the processes of the embodiments are also referred to as an intermittent standby setting section. The processes of S130 to S190 are also referred to as a sleep shift inhibition section.

Further, the processes of S220 to S240 in the processes of the embodiments are also referred to as a sleep state setting section. The processes of S310 and S320 are also referred to as an initial outgoing-call generation section. The process of S330 in the processes of the embodiments is also referred to as a first response determination section. The processes of S340 and S350 are also referred to as a first outgoing-call re-generation section.

Further, the process of S360 in the processes of the embodiments is also referred to as a second response determination section. The processes of S370 and S380 are also referred to as a second outgoing-call re-generation section. The processes of S510 and S760 in the processes of the embodiment are also referred to as a delay acquisition section. The process of S540 is also referred to as an incoming-call acceptance time setting section.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:
    a wireless communication apparatus communicating with a base station, and
    a communication target apparatus communicating with the base station via an Internet, the communication target apparatus communicating with the wireless communication apparatus via the Internet and the base station,
    the wireless communication apparatus having a function of waiting for an incoming-call and including, within a reference cycle shared with the communication target apparatus, (i) a sleep state and (ii) an intermittent standby state,
        the intermittent standby state being configured to have a plurality of repeated states, each of the repeated states intermittently accepting an incoming-call by containing (i) an incoming-call acceptable state and (ii) an incoming-call unacceptable state,
        the sleep state continuing the incoming-call unacceptable state,
    the wireless communication apparatus comprising a control circuit configured to:
        set the wireless communication apparatus into the intermittent standby state, the intermittent standby state being caused to be contained in an incoming-call acceptance ready time within the reference cycle shared with the communication target apparatus, the incoming-call acceptance ready time ranging from an incoming-call acceptance start time point corresponding to an outgoing-call generation time point at which the communication target apparatus generates an outgoing-call to an incoming-call acceptance end time point which is set based on a delay in the outgoing-call, the delay being caused by communication between the base station and the communication target apparatus via the Internet in addition to communication between the wireless communication apparatus and the base station, and the delay being calculated based on a start time when data is transmitted from the communication target apparatus to the wireless communication apparatus through communication via the Internet and the base station until a stop time when a response message is received by the communication target apparatus from the wireless communication apparatus through communication via the Internet and the base station; and
        set the wireless communication apparatus into the sleep state that accepts no incoming-call in a remaining time within the reference cycle excluding the incoming-call acceptance ready time,
    the communication target apparatus comprising a computer configured to:
    generate an outgoing-call at an outgoing-call generation time point that is preset as a time point of generating an outgoing-call to the wireless communication apparatus within the reference cycle that is shared with the wireless communication apparatus, when transmitting any information to the wireless communication apparatus via the base station;
    determine whether a response to an outgoing-call generated by the communication target apparatus itself is received from the wireless communication apparatus via the base station; and
    generate an outgoing-call again at a time point obtained by adding or subtracting a preset predetermined time to or from a next outgoing-call generation time point, respectively, when the computer determines that no response to the outgoing-call is received from the wireless communication apparatus via the base station.

2. The communication system according to claim 1, wherein
    the control circuit included in the wireless communication apparatus is further configured to inhibit shift to the sleep state when an incoming-call from the communication target apparatus is accepted in the intermittent standby state.

3. The communication system according to claim 2, wherein the control circuit included in the wireless communication apparatus inhibits the shift to the sleep state, when the incoming-call from the communication target apparatus is accepted in the intermittent standby state, until a process accompanying the incoming-call is finished.

4. The communication system according to claim 1, wherein the control circuit included in the wireless communication apparatus is further configured to:
    acquire delay information regarding network delay time in communication with the communication target apparatus; and
    set at least one of the incoming-call acceptance start time point or the incoming-call acceptance end time point based on the delay information.

5. The communication system according to claim 1, wherein the computer included in the communication target apparatus is further configured to
    determine whether a response to an outgoing-call generated from the communication target apparatus itself is received from the wireless communication apparatus; and
    generate an outgoing-call at a next outgoing-call generation time point, when the computer determines that no response to the outgoing-call is received from the wireless communication apparatus.

6. The communication system according to claim 1, further comprising:
    a plurality of the wireless communication apparatuses,
    wherein the computer in the communication target apparatus sets different outgoing-call generation time points to the respective wireless communication apparatuses to be dispersed.

7. The communication system according to claim 1, wherein in the wireless communication apparatus, the intermittent standby state repeats a plurality of states, each of the states containing, within a first period of time, (i) the incoming-call acceptable state and (ii) the incoming-call unacceptable state, while the sleep state continues the incoming-call unacceptable state during a second period of time that is longer than the first period of time.

8. The communication system according to claim 1, wherein the wireless communication apparatus is mounted in a vehicle and communicates with the communication target apparatus functioning as a center via a base station.

9. The communication system according to claim 1, wherein while the computer in the communication target apparatus continues repeatedly determining that no response to the outgoing-call is received from the wireless communication apparatus by a repeated number of determination times, the computer repeatedly regenerates a plurality of the outgoing-calls at a plurality of time points which are obtained by repeatedly performing a plurality of shifting processes, each of the shifting processes being adding or subtracting the preset predetermined time to or from the next outgoing-call generation time point, respectively, wherein the repeated number of determination times is identical to a performed number of the shifting processes.

10. The communication system according to claim 1, wherein the wireless communication apparatus communicates directly with the base station without using the Internet and the communication target apparatus only communicates with the wireless communication apparatus through the base station and only communicates with the base station via the internet.

11. A wireless communication apparatus communicating with a base station that communicates with a communication target apparatus via an Internet, the wireless communication apparatus waiting for an incoming-call coming from the communication target apparatus via the Internet and then the base station,
the wireless communication apparatus comprising a control circuit configured to:
share a reference cycle with the communication target apparatus;
define (i) a sleep state and (ii) an intermittent standby state,
the intermittent standby state having a plurality of repeated states, each of the repeated states that intermittently accepts an incoming-call by containing (i) an incoming-call acceptable state and (ii) an incoming-call unacceptable state,
the sleep state continuing the incoming-call unacceptable state;
set the wireless communication apparatus into the intermittent standby state, the intermittent standby state ranging from an incoming-call acceptance start time point corresponding to an outgoing-call generation time point at which the communication target apparatus generates an outgoing-call to an incoming-call acceptance end time point which is set based on a delay in the outgoing-call that comes to the wireless communication apparatus as an incoming-call, the delay being caused by communication between the base station and the communication target apparatus via the Internet in addition to communication between the wireless communication apparatus and the base station and the delay being calculated based on a start time when data is transmitted from the communication target apparatus to the wireless communication apparatus through communication via the Internet and the base station until a stop time when a response message is received by the communication target apparatus from the wireless communication apparatus through communication via the Internet and the base station; and
set the wireless communication apparatus into the sleep state that accepts no incoming-call in a remaining time within the reference cycle excluding the intermittent standby state.

12. The wireless communication apparatus according to claim 11,
wherein the control circuit is further configured to:
acquire delay information regarding network delay time in communication with the communication target apparatus via the base station and the Internet; and
set at least one of the incoming-call acceptance start time point or the incoming-call acceptance end time point based on the delay information.

13. A communication system comprising:
a wireless communication apparatus communicating with a base station;
a communication target apparatus communicating with the base station via an Internet, the communication target apparatus communicating with the wireless communication apparatus via the Internet and the base station, the communication target apparatus having a shared information database that stores a shared reference cycle for the wireless communication apparatus, the shared reference cycle having an incoming-call acceptance start time and an incoming-call acceptance end time, the communication target apparatus being configured to communicate the shared reference cycle having the incoming-call acceptance start time and the incoming-call acceptance end time to the wireless communication apparatus;
the wireless communication apparatus being configured to:
operate in an intermittent standby state commencing at the incoming-call acceptance start time and continuing until the incoming-call acceptance end time and to operate in a sleep state commencing at the incoming-call acceptance end time and continuing for a remainder of the shared reference cycle, the intermittent standby state having a plurality of repeated states, the incoming-call acceptance end time being based on a delay calculated based on a start time when data is transmitted from the communication target apparatus to the wireless communication apparatus through communication via the Internet and the base station until a stop time when a response message is received by the communication target apparatus from the wireless communication apparatus through communication via the Internet and the base station;
operate in an incoming-call acceptable state during which incoming calls are accepted by the wireless communication apparatus for a first time period of each repeated state and in an incoming-call unacceptable state during which incoming calls are not accepted by the wireless communication apparatus for a second time period of each repeated state; and
operate in the incoming-call unacceptable state during which incoming calls are not accepted while operating in the sleep state;
the communication target apparatus comprising a computer configured to:

generate a first outgoing-call for transmitting information to the wireless communication apparatus via the base station at a first outgoing-call generation time point that is preset to occur within the shared reference cycle between the incoming-call acceptance start time and the incoming-call acceptance end time of the shared reference cycle;

determine whether a response to the first outgoing-call is received from the wireless communication apparatus via the base station; and generate a second outgoing-call at a second outgoing-call generation time point obtained by adding or subtracting a preset predetermined time to or from the first outgoing-call generation time point within the shared reference cycle in response to determining that the response to the first outgoing-call was not received from the wireless communication apparatus via the base station.

14. The communication system according to claim 13, wherein the wireless communication apparatus includes a high-speed clock and a low-speed clock, the wireless communication apparatus being further configured to operate both the high-speed clock and the low-speed clock while in the incoming-call acceptable state and to stop the high-speed clock and operate only the low-speed clock while in the incoming-call unacceptable state.

15. The communication system according to claim 13, wherein the shared reference cycle is thirty second long, the incoming-call acceptance start time until the incoming-call acceptance end time is ten seconds, and the remainder of the shared reference cycle is twenty seconds.

16. A communication system comprising:
a wireless communication apparatus communicating with a base station, and
a communication target apparatus communicating with the base station via an Internet, the communication target apparatus communicating with the wireless communication apparatus via the Internet and the base station,
the wireless communication apparatus having a function of waiting for an incoming-call and including, within a reference cycle shared with the communication target apparatus, (i) a sleep state and (ii) an intermittent standby state,
the intermittent standby state being configured to have a plurality of repeated states, each of the repeated states intermittently accepting an incoming-call by containing (i) an incoming-call acceptable state and (ii) an incoming-call unacceptable state,
the sleep state continuing the incoming-call unacceptable state,
the wireless communication apparatus comprising a control circuit configured to:

set the wireless communication apparatus into the intermittent standby state, the intermittent standby state being caused to be contained in an incoming-call acceptance ready time within the reference cycle shared with the communication target apparatus, the incoming-call acceptance ready time ranging from an incoming-call acceptance start time point corresponding to an outgoing-call generation time point at which the communication target apparatus generates an outgoing-call to an incoming-call acceptance end time point which is set based on a delay in the outgoing-call; and set the wireless communication apparatus into the sleep state that accepts no incoming-call in a remaining time within the reference cycle excluding the incoming-call acceptance ready time, the communication target apparatus comprising a computer configured to:

generate an outgoing-call at an outgoing-call generation time point that is preset as a time point of generating an outgoing-call to the wireless communication apparatus within the reference cycle that is shared with the wireless communication apparatus, when transmitting any information to the wireless communication apparatus via the base station;

determine whether a response to an outgoing-call generated by the communication target apparatus itself is received from the wireless communication apparatus via the base station; and generate an outgoing-call again at a time point obtained by adding or subtracting a preset predetermined time to or from a next outgoing-call generation time point, respectively, when the computer determines that no response to the outgoing-call is received from the wireless communication apparatus via the base station; and wherein the delay is calculated based on a start time when data is transmitted from the communication target apparatus to the wireless communication apparatus through communication via the Internet and the base station until a stop time when a response message is received by the communication target apparatus from the wireless communication apparatus through communication via the Internet and the base station.

17. The communication system according to claim 16, wherein the control circuit included in the wireless communication apparatus is further configured to:
acquire delay information regarding network delay time in communication with the communication target apparatus; and
set at least one of the incoming-call acceptance start time point or the incoming-call acceptance end time point based on the delay information.

* * * * *